Aug. 7, 1923.
D. P. STARK ET AL
1,464,453
ANIMAL TRAP
Filed Nov. 2, 1922
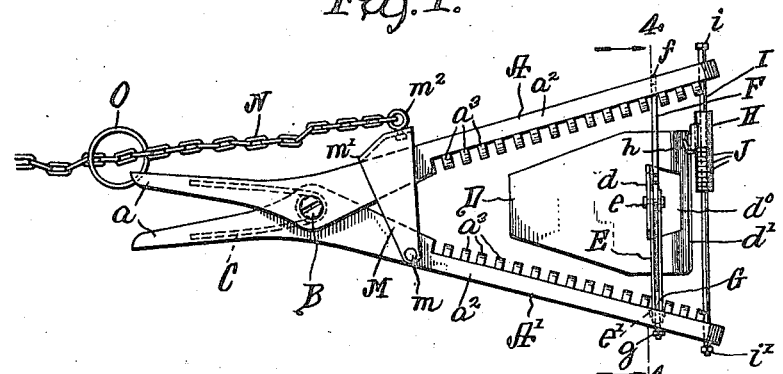
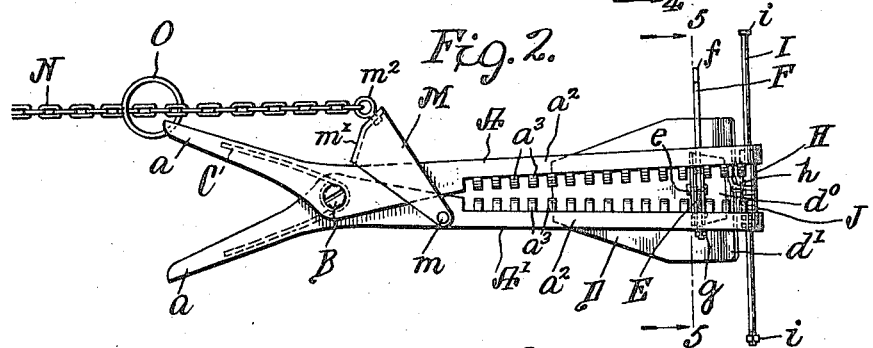
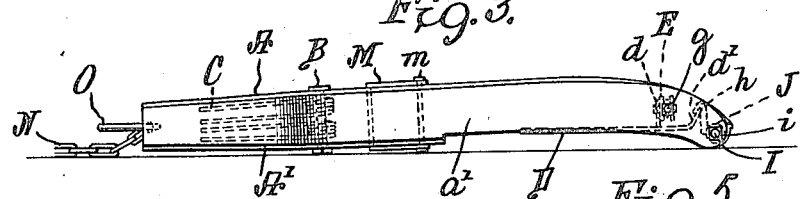
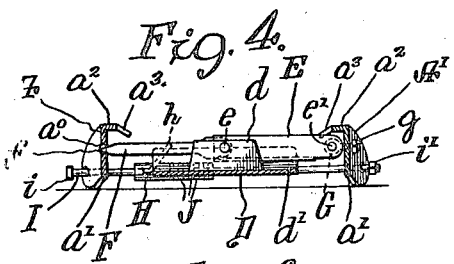
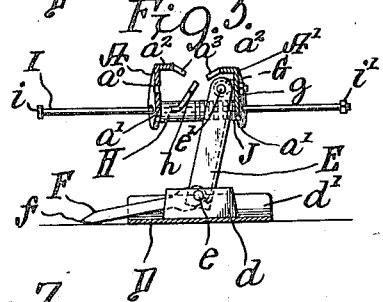
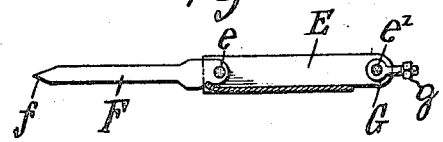

Patented Aug. 7, 1923.

1,464,453

UNITED STATES PATENT OFFICE.

DAVID P. STARK AND GEORGE A. HIGBEE, OF PLACERVILLE, CALIFORNIA.

ANIMAL TRAP.

Application filed November 2, 1922. Serial No. 598,566.

*To all whom it may concern:*

Be it known that we, DAVID P. STARK and GEORGE A. HIGBEE, citizens of the United States, residing at Placerville, in the county of Eldorado and State of California, have invented certain new and useful Improvements in Animal Traps; and we do hereby declare the following to be a full, clear, and exact description of the invention, such as will enable others skilled in the art to which it appertains to make and use the same.

Our invention relates to improvements in animal traps intended to catch rats, weasels, mink, or other small animals, in which the animal will be securely held against escape by gnawing off the leg caught in the trap.

The invention is also intended to provide a trap which will jump up in operation, gripping the leg of the animal higher up than would occur if the trap remained flat on the ground.

The invention is also intended to provide means for so adjusting the trap that it will not catch birds, or very small animals, such as mice, which may accidentally spring the same.

These and other objects of the invention will be more fully understood after reference to the accompanying drawings, in which like parts are indicated by similar reference symbols throughout the several views, and in which:—

Figure 1 is a plan view showing the trap set.
Figure 2 is a similar view showing the trap after it has been sprung.

Figure 3 is a side elevation of the device in the position shown in Fig. 1.

Figure 4 shows a section along the line 4—4 of Fig. 1, and looking in the direction of the arrows.

Figure 5 shows a section along the line 5—5 of Fig. 2, and looking in the direction of the arrows.
In this view the jaws of the trap are shown as lifted above the ground.

Figure 6 is a sectional view showing the trigger and connected parts detached from the apparatus, the parts being shown on a larger scale than in Fig. 4; and Figure 7 is a detail showing in perspective the hook for engaging the pedal or tripping plate on which the animal steps incident to springing the trap.
The trap comprises two jaws A and A', pivoted together as at B. These jaws have the short arms $a$ normally pressed outwards by the spring C. This spring is shown as a coil spring, but a leaf spring or other suitable form of spring may be adopted if desired; but the spring should have the force required of the trap which will be obviously greater where large animals are to be caught and held than where small animals are to be caught and held.

The front end of the jaws A and A' are each provided with a substantially vertical web $a'$, which is flanged over at the top, as at $a^2$, and terminates in teeth $a^3$ downwardly inclined, as shown most clearly in Figs. 4 and 5. The web $a'$ not only adds vertical stiffness to the jaws, but also serves to space the teeth at some distance above the pedal D, so that the animal will be caught at some distance above the foot or feet engaging the said pedal. The height on the leg at which the teeth engage will be further effected by the jumping action of the trap to be hereinafter described.

D represents the pedal or tripping plate which is perforated, as at $d^0$, to provide an upturned flange $d$, and it is also provided at its outer end with an upturned flange $d'$, for reasons that will be hereinafter described.

The flange $d$ has pivoted thereto, as at $e$, the link E and the trigger F. This trigger F is provided with a point $f$ which, when the trap is set, projects into a notch $a^0$ in the jaw A, as shown most clearly in Figs. 4 and 5. The link E is pivoted, as at $e'$, to the eye-bolt G, which is secured to the jaw A', as by the nut $g$. Thus the pedal D is flexibly but securely connected to the trap.

In order to steady the pedal D, and provide a fulcrum for the operation of the trigger, a suitable hook $h$ is provided, mounted on the sleeve H which is slidably mounted on the rod I which passes freely through the ends of the two jaws A and A', and is provided at one end with a head $i$, and at the other end with a nut $i'$, so that the said rod is also permanently connected to the trap but may be removed therefrom when desired.

In order to space the gripping jaws when the trap is sprung, so as to permit it to release small animals, and to prevent it from cutting through the legs of larger animals, we provide suitable washers J which are also slidably mounted on the rod I, and by varying the aggregate thickness of these washers the distance apart of the ends of the gripping jaws may be adjusted as desired, for instance as shown in Fig. 2.

In order to prevent the trap from being dragged away by the animal caught therein, and also to cause the jaws to set tighter the more the animal pulls on the trap, we provide a yoke M, pivoted to the rod $m$, connected to one of the jaws, as A'; said yoke having its top $m'$ engaging the opposite jaw A, this top portion being also provided with an eye-bolt $m^2$ to which the chain N is connected. This chain passes through the guide ring O secured to the jaw A, and its outer end is fastened to some suitable object, not shown.

It will be seen that if the animal attempts to carry the trap off, he will drag on this chain and will cause the yoke to press on the two jaws together, thus supplementing the action of the spring C.

The operation of the device is as follows: Suppose the parts to be in the position shown in Fig. 2, to set the trap spread the jaws A and A' apart, which may be accomplished without risk to the operator by squeezing in with his left hand on the short arms $a$, and, holding the jaws open, insert the point $f$ of the trigger F in the hole $a^0$ of the jaw A, with the link E and the trigger in alignment, as shown in Fig. 4, and engage the hook $h$ over the flange $d'$ of the pedal D. Incident to this operation, the operator will have his right hand free to adjust the parts just referred to, while he is holding the short arms $a$ in the contracted position.

Now if these arms $a$ be eased down until the parts remain in the position shown in Fig. 1, the trap will be set. It may be placed in the path frequented by the animals, such as the runway in front of the animal's hole, or in a box or tile under a road or the like, or the trap may also be baited if desired.

It will be noted that the parts E and F, when the trap is set, will be of the nature of a toggle joint, which will be locked in the distended position by means of the hook $h$. Now if the animal steps on the pedal D, this toggle joint will be broken or bent downwards, and both jaws A and A' will tend to fly together and the pedal D will be pressed downwards from the position slightly raised above the ground, as shown in Fig. 3; the result being to cause the front end of the jaws A and A' to jump upwards and nip the leg or legs of the animal higher up than would be the case if the parts remained relatively in the same horizontal plane.

The collar H and the washers J will limit the approach of the jaws A and A', and thus will permit any small animals, such as birds, mice, or the like to escape, but will hold the legs of the larger animals. The teeth $a^3$ being downwardly inclined and the webs $a'$ will in a large measure prevent the animal from gnawing off the wounded leg or legs and escaping, as it cannot get at the wound with its teeth.

The yoke M will tend to cause the jaws A and A' to grip together tighter if the animal tugs on the chain N, as it will do in trying to escape. Moreover the shape of the teeth $a^3$ will tend to bite more securely into the parts of the animal's leg or legs.

Thus it will be seen that we provide a trap which may be readily and safely set by the operator without risk of injury to himself, and which may be easily sprung by animals passing or attempting to pass over the same, and which may be regulated to trap animals of or above a certain size, but will not trap those of smaller size.

The invention may be cheaply made of sheet metal and is not likely to get out of order in use, and is also simple and efficient in use.

It will be obvious that various modifications might be made in the herein described apparatus, and in the construction, combination and arrangement of parts which could be used without departing from the spirit of our invention; and we do not mean to limit the invention to such details except as particularly pointed out in the claims.

Having thus described our invention what we claim and desire to secure by Letters Patent of the United States is:—

1. An animal trap comprising two jaws pivoted together and provided with teeth and oppositely disposed arms, with a spring normally pressing said arms outward, with a pedal adapted to be mounted between said jaws, a link pivotally connecting the pedal to one of said jaws, with a trigger pivoted to said pedal and adapted to engage the opposite jaw, said link and said trigger forming a toggle joint, and means for normally holding said pedal in the operative position, but permitting same to be pressed downwards and thereby to break said toggle joint.

2. An animal trap comprising two jaws pivoted together and provided with teeth and oppositely disposed arms, with a spring normally pressing said arms outward, with a pedal adapted to be mounted between said jaws, a link pivotally connecting the pedal to one of said jaws, with a trigger pivoted to said pedal and adapted to engage the opposite jaw, said link and said trigger forming a toggle joint, and means for normally holding said pedal in the operative position, but permitting same to be pressed downwards and thereby to break said toggle joint, a yoke having arms pivoted to one of said jaws, and its central transverse portion engaging the opposite jaw, a guide ring secured to one of said arms, and a fastening chain secured to said yoke and rove through said ring.

3. An animal trap comprising two jaws pivoted together and provided with teeth and oppositely disposed arms, with a spring normally pressing said arms outward, with a pedal adapted to be mounted between said jaws, a link pivotally connecting the pedal to one of said jaws, with a trigger pivoted to said pedal and adapted to engage the opposite jaw, said link and said trigger forming a toggle joint, means for normally holding said pedal in the operative position, but releasing same under downward pressure, and means for limiting the inward travel of said jaws.

4. An animal trap comprising two jaws pivoted together and provided with teeth and oppositely disposed arms, with a spring normally pressing said arms outward, with a pedal adapted to be mounted between said jaws, a link pivotally connecting the pedal to one of said jaws, with a trigger pivoted to said pedal and adapted to engage the opposite jaw, said link and said trigger forming a toggle joint, means for normally holding said pedal in the operative position, but releasing same under downward pressure, and means for limiting the inward travel of said jaws, comprising a transverse rod loosely connected to both of said jaws, and extending between same when said jaws are distended, with spacing means slidably mounted on said rod.

5. An animal trap comprising two jaws pivoted together and provided with vertical webs having downwardly inclined teeth projecting inwardly from the upper edge thereof, said jaws having oppositely disposed arms, with a spring normally pressing said arms outward, with a pedal adapted to be mounted between said jaws, a link pivotally connecting the pedal to one of said jaws, with a trigger pivoted to said pedal and adapted to engage the opposite jaw, said link and said trigger forming a toggle joint, and means for normally holding said pedal in the operative position, but permitting same to be pressed downwards and thereby to break said toggle joint.

6. An animal trap comprising two jaws pivoted together and provided with vertical webs having downwardly inclined teeth projecting inwardly from the upper edge thereof, said jaws having oppositely disposed arms, with a spring normally pressing said arms outward, with a pedal adapted to be mounted between said jaws, a link pivotally connecting the pedal to one of said jaws, with a trigger pivoted to said pedal and adapted to engage the opposite jaw, said link and said trigger forming a toggle joint, and means for normally holding said pedal in the operative position, but permitting same to be pressed downwards and thereby to break said toggle joint, a yoke having arms pivoted to one of said jaws, and its central transverse portion engaging the opposite jaw, a guide ring secured to one of said arms, and a fastening chain secured to said yoke and rove through said ring.

7. An animal trap comprising two jaws pivoted together and provided with vertical webs having downwardly inclined teeth projecting inwardly from the upper edge thereof, said jaws having oppositely disposed arms, with a spring normally pressing said arms outward, with a pedal adapted to be mounted between said jaws, a link pivotally connecting the pedal to one of said jaws, with a trigger pivoted to said pedal and adapted to engage the opposite jaw, said link and said trigger forming a toggle joint, means for normally holding said pedal in the operative position, but releasing same under downward pressure, and means for limiting the inward travel of said jaws.

8. An animal trap comprising two jaws pivoted together and provided with vertical webs having downwardly inclined teeth projecting inwardly from the upper edge thereof, said jaws having oppositely disposed arms, with a spring normally pressing said arms outward, with a pedal adapted to be mounted between said jaws, a link pivotally connecting the pedal to one of said jaws, with a trigger pivoted to said pedal and adapted to engage the opposite jaw, said link and said trigger forming a toggle joint, means for normally holding said pedal in the operative position, but releasing same under downward pressure, and means for limiting the inward travel of said jaws, comprising a transverse rod loosely connected to both of said jaws, and extending between same when said jaws are distended, with spacing means slidably mounted on said rod.

DAVID P. STARK.
GEORGE A. HIGBEE.